United States Patent [19]

Luehrs et al.

[11] Patent Number: 5,757,178

[45] Date of Patent: May 26, 1998

[54] METHOD OF DETERMINING THE SPEED OF RAILWAY VEHICLES, IN PARTICULAR THOSE WITH BOGIES

[75] Inventors: Peter Luehrs; Gerhard Wilms, both of Braunschweig, Germany

[73] Assignee: Siemens Aktiengesellschaft, Munich, Germany

[21] Appl. No.: 500,899

[22] PCT Filed: Jan. 20, 1994

[86] PCT No.: PCT/DE94/00054

§ 371 Date: Dec. 20, 1995

§ 102(e) Date: Dec. 20, 1995

[87] PCT Pub. No.: WO94/17422

PCT Pub. Date: Aug. 4, 1994

[30] Foreign Application Priority Data

Jan. 21, 1993 [DE] Germany .................. 43 02 092.5

[51] Int. Cl.[6] .................. G01P 3/66; G08G 1/01
[52] U.S. Cl. .................. 324/178; 340/936
[58] Field of Search .................. 324/178, 179, 324/160, 180, 207.11, 207.12, 207.22, 225; 246/182 R, 247, 249, 128; 340/670, 933, 936, 938

[56] References Cited

U.S. PATENT DOCUMENTS

| | | | |
|---|---|---|---|
| 3,281,593 | 10/1966 | Mendelsohn | 324/179 |
| 3,573,441 | 4/1971 | Glazar | 324/179 X |
| 4,256,278 | 3/1981 | Sanville | 246/247 |
| 4,283,031 | 8/1981 | Finch | 324/179 X |
| 4,514,690 | 4/1985 | Miller, Jr. et al. | 324/225 |
| 5,331,276 | 7/1994 | Polvani et al. | 324/179 X |

FOREIGN PATENT DOCUMENTS

| | | | |
|---|---|---|---|
| 0 280 878 | 9/1988 | European Pat. Off. | |
| 0 288 952 | 11/1988 | European Pat. Off. | |
| 1814058 | 6/1970 | Germany | 324/179 |
| 28 00 373 | 7/1979 | Germany | |
| 31 06 432 | 9/1982 | Germany | |

Primary Examiner—Sandra L. O'Shea
Assistant Examiner—Roger Phillips
Attorney, Agent, or Firm—Kenyon & Kenyon

[57] ABSTRACT

In order to exclude disturbing influences in the determination of the axle-related speeds of railway vehicles, the signals generated by the passage of the last axle of a bogie are discerned from spurious signals. This is carried out by specifying a time window within which the last axle of a bogie must have passed the measuring zone. Those signals separated by about the same offset time as the time between the passage of the first axle of the first and second sensors are used for the determination of the speed of this last axle. An additional integrity check further increases the reliability signal identification by comparing the sum of certain measured time values which have been detected by the two sensors of the measuring zone. The assignment of the time values respectively to the pulse centers of the event indication eliminates different response tolerances of the sensors due to the lateral offset of the vehicle wheels with respect to the rails in the region of the sensors. The speed of railway vehicles may thus be reliably and continuously determined upon passing a measuring zone, even when the sensors generate spurious signals due to disturbances such as electromagnetic rail brakes or eddy-current rail brakes on the vehicles.

10 Claims, 2 Drawing Sheets

METHOD OF DETERMINING THE SPEED OF RAILWAY VEHICLES, IN PARTICULAR THOSE WITH BOGIES

BACKGROUND OF THE INVENTION

The present invention relates to a method for reliably determining the speed of railway vehicles, particularly those with bogies, as the vehicles pass a measuring zone. In the measuring zone, axles of the railway vehicle pass two sensors spaced a known distance apart.

Such a method fore determining the speed of railway vehicles is known in conjunction with a device for controlling a train stop in railway systems from DE 31 06 432 C2. There, the determination of the speed of railway vehicles is carried out using two pulse generators which are arranged a given distance apart along a line and can be influenced by the rail vehicles, the respectively measured average travelling speed being obtained from the relationship V=s/t, where V indicates the speed, s the distance between the pulse generators and t the time which the individual wheelsets require from passing the first pulse generator to passing the second pulse generator.

The known device and the method applied there for determining the speed of railway vehicles has proved generally successful in practice. However, difficulties can arise if the vehicles are equipped with electromagnetic rail brakes or eddy-current brakes, because these brakes can influence the event indicators arranged on the line in an undesired way. The handling of vehicles with such brakes in axle-counting systems and systems for determining the speed of running-over railway vehicles is problematic because the brakes do not necessarily act in the same way on the event indicators used for the detecting of wheelsets and for the determining of advancing speeds. For example, it may be the case that such a brake is detected by a first event indicator as a running-over event, but not by a second indicator. It is also possible for one event indicator to detect one running-over event and the other to detect two running-over events when a vehicle with a brake passes. The existence of such event indications not caused by wheel axles had until now the result that the advancing speed could be reliably determined only in each case for the first axle of such a bogie. For all the remaining axles of a vehicle or set of vehicles which pass the measuring zone, speed determination is no longer possible if, due to unsymmetrical influencing of the two event indicators, there is no longer any fixed assignment between the respectively detected event indications and the vehicle axles causing them.

It would be desirable to determine the advancing speed of the remaining axles of a vehicle or a set of vehicles, in order to be informed in this way of the particular advancing speed of this set of vehicles. Specifically, if the latter were to accelerate, there would possibly be the need for automatic braking before a signal, or else a speed restriction. The problems involving the disturbing influence of electromagnetic rail brakes on axle counters is known (DE 38 42 882 A1). At present there are still no reliable measures for suppressing the disturbing influence of electromagnetic brakes or eddy-current brakes on a rail-side event indicators.

SUMMARY OF THE INVENTION

The present invention reliably discriminates between signals corresponding to passing axles of the railway vehicle and spurious signals that may be caused by disturbances such as the activation of electromagnetic brakes or eddy-current brakes. According to the present invention, it is possible to blank out the effects of any disturbances on rail-side sensors for determining the speed of the axles of railway vehicles, in particular those with bogies.

The present invention achieves this objective by establishing time windows, initiated by the passage and detection of a first axle, within which a following axle must pass and be detected in order to be used to calculate the speed of the passing vehicle. Spurious signals detected outside of these time windows, say from electromagnetic brakes, are disregarded.

The time window commences when the first axle passes over the second sensor and closes after a time by which the second axle must have passed the second sensor. Signals generated by the sensors that occur outside of the time window are disregarded. The time window may be calculated by multiplying the time between the passage of the first axle over the first and second sensors by the maximum distance between the first and second axles, and dividing the result by the distance between the first and second sensors. In this way, time window can be made variable and be adapted to the actual advancing speed of the advancing vehicle, resulting in a more accurate signal discrimination, and thus a more reliable speed determination.

The signals actually associated with the passage of an axle are made even more reliable by measuring the offset time between the signals generated by the first axle as the first axle passes over the first and second sensors, and ensuring that it is about the same as the offset time between the signals generated by the second axle as the second axle passes over the first and second sensors. If the times are not about the same, the signals are disregarded as unreliable, and not used to calculate the speed of the vehicle.

The reliability of the speed values determined by the method according to the invention can be increased considerably if the measured time values are subjected to a further integrity check. Intermediate time intervals are measured between each signal generated by the first sensor between the passage of the first axle and the purported passage of the second axle. Another set of intermediate time intervals are measured between each signal generated by the second sensor between the passage of the first axle and the purported passage of the second axle. Signals associated with the passage of the second axle are disregarded unless sum of the first intermediate time intervals is at least approximately equal to the sum of the second intermediate time intervals.

It proves to be particularly advantageous if the measuring times are triggered not by the edges of the signals but by their respective midpoints. In this way it is possible to compensate completely for different response tolerances of the sensors due to vehicle wheels deviating laterally from the rails to a greater or lesser extent. The midpoints can be determined by averaging the times for the leading and trailing edges of the signals. This may be achieved by digitizing the signals.

DETAILED DESCRIPTION

Figure 4:
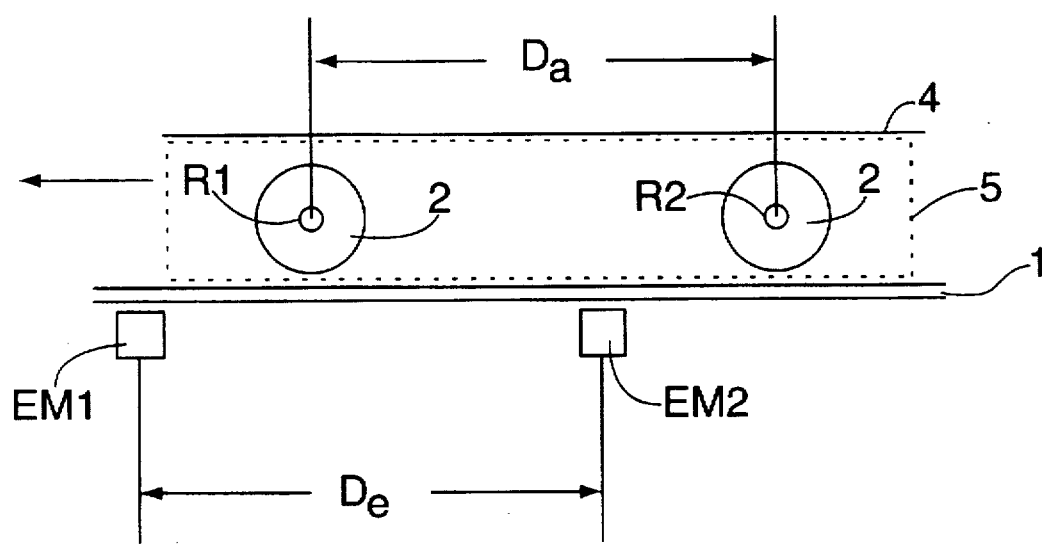
FIG. 4 shows two sets of wheels supported by axles on a vehicle on rails passing through a measuring zone with two sensors.

FIG. 4 shows event indicator sensors EM1 and EM2 near a rail 1. The rail supports wheels 2 mounted on axles R1 and R2 which support a carriage 4. The carriage 4 is part of a railway vehicle (not shown). The axle-mounted wheel assembly may comprise a bogey 5 when the axles occur in close relation to one another. The midpoints of the axles are separated from each other by distance Da. The sensors are separated from each other by distance De.

As the railway vehicle moves to the left, axle R1 first passes over sensor EM1 and then over sensor EM2, generating electrical pulses in both sensors. Subsequently, axle R2 passes over sensor EM1 and then over sensor EM2, likewise generating electrical pulses.

Figure 1:
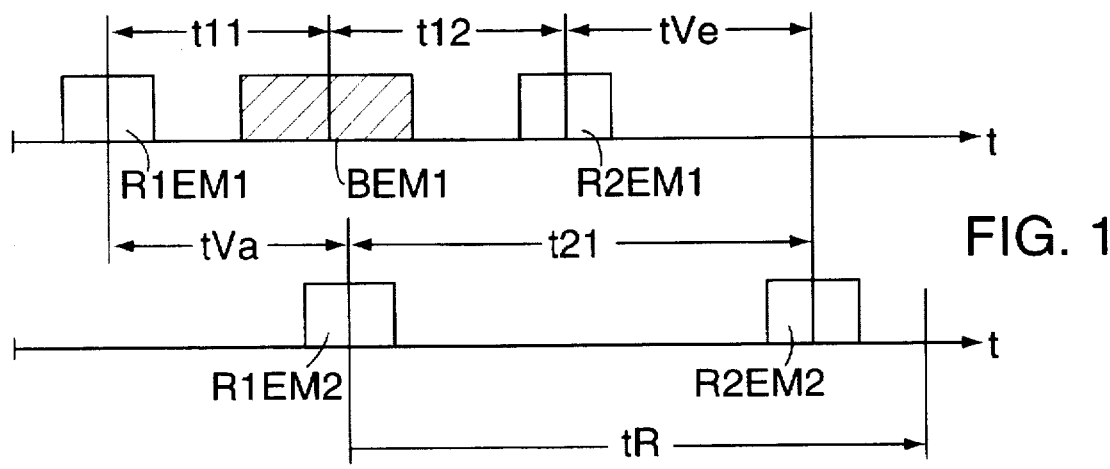
FIG. 1 shows a train of pulses generated by two sensors in response to axles of a railway vehicle passing thereby, as well as one spurious signal from one sensor.

FIG. 1 shows the electrical pulses generated in sensor EM1 and EM2 as the railway vehicle moves to the left. Pulse R1EM1 is generated as axle R1 passes over sensor EM1; R2EM1 is generated as the following axle, R2, passes over sensor EM1. R1EM2 is generated as axle R1 passes over sensor EM2; R2EM2 is generated as the following axle, R2, passes over sensor EM2.

A sensor may occasionally generate a signal which is apparently caused by the passage of an axle, but which is actually caused by some other effect, such as the activation of an electromagnetic brake. This is show in FIG. 1 as the shaded area designated BEM1.

The present invention provides a method for discerning signals such as RLEMI and R1EM2 from signals such as BEM1. The speed of a railway vehicle can be more reliably calculated by using only signals corresponding to the passage of axles, and disregarding spurious signals caused by events such as braking.

The signal generated by the passage of the first axle R1 is absolutely reliable because spurious disturbances only effect sensors EM1 and EM2 after the first axle R1 has completely passed event indicator EM1. Identifying the signal generated by the passage of the last axle R2 is somewhat more problematic.

The present invention solves this problem by establishing a measuring time window tR within which the signal generated by the passage of the second axle R2 must occur. Signals which do not occur entirely within time window tR are recognized as spurious and are disregarded. The time window tR may comprise a constant time span. However, it is more advantageous to adapt the duration of the time window to the particular speed of the vehicle such that it closes shortly after the event indications of the last axle R2. In an advantageous embodiment, the duration of time window tR is defined as the ratio of the known distance Da between axles R1 and R2 to the distance De between sensors EM1 and EM2, multiplied by the time between the passage of axle R1 over sensor EM1 and its passage over sensor EM2. The time window tR starts as soon as axle R1 passes over sensor EM2. Signals R2EM1 and R2EM2 in FIG. 1 must occur within time window tR. As is shown in FIG. 1, signal BEM1 does not entirely occur within this window, so it is properly disregarded as being spurious.

Figure 2:
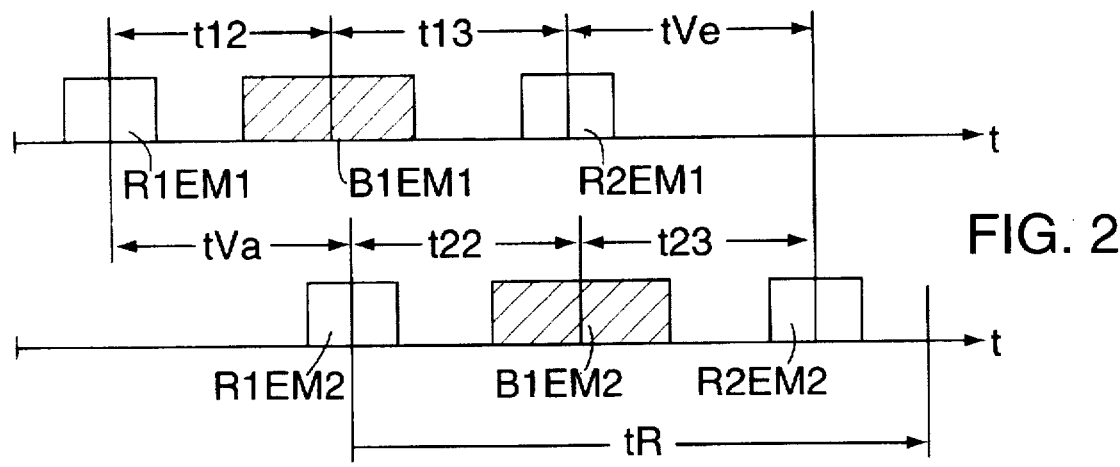
FIG. 2 shows a train of pulses generated by two sensors in response to axles of a railway vehicle passing thereby, as well as one spurious signal generated from each sensor.

A further advantageous way to reliably identify the signals generated by passing axles R1 and R2 relies upon the fact that the time it takes R1 to pass over EM1 and EM2, shown in FIG. 2 as offset time tVa, is about the same as the time it takes R2 to pass over EM1 and EM2, shown in FIG. 2 as offset time tVe. This is especially true when the vehicle speed has not changed appreciably while passing by the sensors. If a change in speed is expected, the offset times tVe and tVa may also differ slightly from each other. However, these differences are not so great as to interfere with the reliable identification of the signals caused by the last bogie axle R2.

If offset times tVe and tVa differ too much, the signals generated by the passage of the last axle R2 over sensors EM1 and EM2 cannot be used for speed determination.

In order to further increase the reliability of identifying the last axle of a bogie, it is advantageous to add up the sum of the intermediate time intervals between each of the signals generated by the sensor EM1 between the passing of the first axle and the last axle and compare this with the corresponding sum value from sensor EM2. The sum of these intermediate time measurements must be the same for both sensors EM1 and EM2 if the same vehicle axles are concerned. With respect to the exemplary embodiment of FIG. 1, the sum of the intermediate time spans t11 and t12 between the event indications registered by the event indicator EM1 must thus be equal to the intermediate time span t21 between the event indications detected by the other event indicator. If this condition is met, the event indications at either end of the intermediate time intervals represented by t11 and t12 and at either end of t21 are recognized as true indications of passing axles. This functions as an additional integrity check to ensure that the signals do in fact represent passing axles, and are not spurious.

In the case of the exemplary embodiment of FIG. 2, the two sensors have each generated spurious signals B1EM1 and B1EM2, each caused by a different event. Here too, the signal generated by the last axle R2 can be identified without difficulty by means of their temporal offset tVe, which corresponds to the temporal offset tVa of the running-over events triggered by the first axle R1. The integrity of this determination is confirmed by comparing the sum of the intermediate time intervals t12 and t13 to the sum of the intermediate time intervals t22 and t23 and recognizing that they are the of the same duration.

Figure 3:
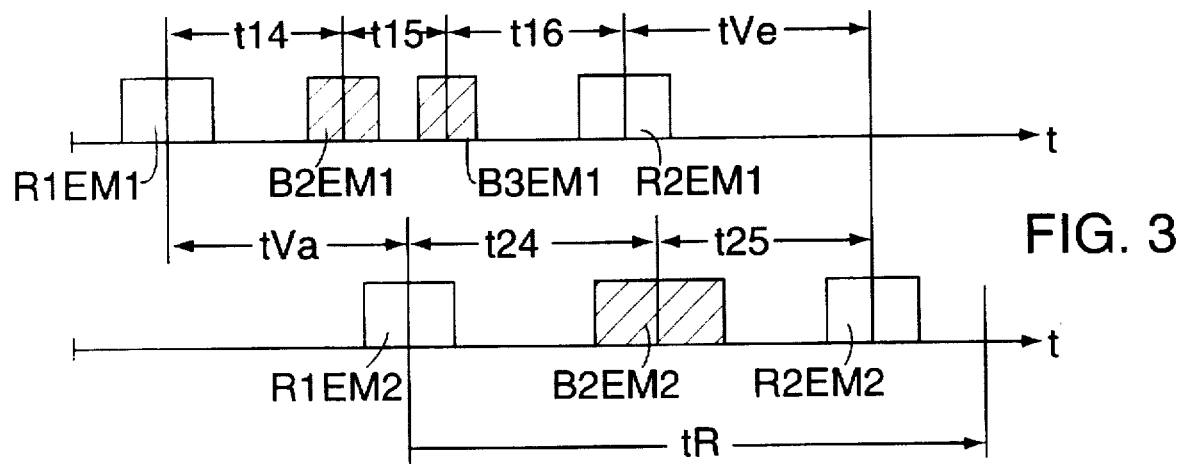
FIG. 3 shows a train of pulses generated by two sensors in response to axles of a railway vehicle passing thereby, as well as two spurious signals from one sensor and one spurious signal from the other sensor.

In the case of the exemplary embodiment of FIG. 3, it is assumed that both sensors EM1 and EM2 have generated spurious event indications B2EM1, B3EM1, and B2EM2. In this case too, the running-over events of the first axle R1 and the last axle R2 can be reliably determined by investigating the time window tR for the existence of event indications R2EM1 and R2EM2. Signal B2EM1 is outside of time window tR, and so is disregarded. The offset time tVe is equal to offset time tVa, identifying signals R2EM1 a R2EM2 as representing the passage of axle R2. Further, the sum of the intermediate time intervals t14, t15 and t16 of the influences detected by the one event indicator is equal to the sum of the intermediate time intervals t24 and t25 of the influences detected by the other event indicator, further establishing the integrity of signals R1EM1, R1EM2, R2EM1 and R2EM2 as the signals corresponding to the actual passage of axles R1 and R2 over the sensors, the other signals may be disregarded as spurious, and will not be used in calculating the speed of the railway vehicle.

It is particularly advantageous to use the centers, rather than the leading or trailing edges, of the signals generated by the sensors as time values which are used to determine the speed of the railway vehicles. These pulse centers can be determined without difficulty by digitizing the signals generated by the sensors, and then averaging the times of the leading and trailing edges. In this way it is possible to eliminate the effects of axles with different lateral offset with respect to the running rails and consequently of the signals generated by the sensors.

The method according to the invention for determining the speed of railway vehicles may be applied to vehicles with or without bogies. If the wheels are too far apart, though, the time window tR opened by the first axle R1 of a vehicle closes before a following axle R2 of the vehicle enters the measuring zone. However, the situation is different if the distance between the last axle of a vehicle and the first axle of a following vehicle is very small and is of the order of magnitude of the wheel base of bogies. By applying the method of the present invention to the signals generated by such axles, any disturbances generating spurious signals can be recognized and disregarded.

The method according to the present invention advantageously eliminates all wheel-independent disturbing influences whenever they have been sensed between the signals generated for the first axle R1 and the last axle R2 by at least one event indicator.

We claim:

1. A method for determining the speed of a railway vehicle as the axles of the vehicle pass first over a first sensor, and then over a second sensor, comprising the steps of:
   a. establishing a time window of a predetermined time duration starting from when the first axle passes the first sensor and extending until after the second axle passes the second sensor;
   b. disregarding signals generated by the sensors that occur outside of said time window;
   c. measuring a first offset time between the signals generated by the first axle as the first axle passes over the first and second sensors;
   d. measuring a second offset time between the signals generated by the second axle as the second axle passes over the first and second sensors, wherein said first and second offset times define corresponding first and second time intervals;
   e. comparing said first and second offset times, and using said time intervals to determine the speed of the railway vehicle only if said first time interval is at least approximately equal to said second time interval.

2. The method of claim 1 whereby the predetermined time duration of said time window is determined for each pair of axles by multiplying said first offset time by the maximum distance between the first and second axles, and dividing the result by the distance between the first and second sensors.

3. The method of claim 1, comprising the additional steps of:
   a. measuring first intermediate time intervals between each signal generated by the first sensor between the passage of the first axle and the purported passage of the second axle;
   b. measuring second intermediate time intervals between each signal generated by the second sensor between the passage of the first axle and the purported passage of the second axle;
   c. disregarding the signals associated with the passage of the second axle unless the sum of said first intermediate time intervals is at least approximately equal to the sum of said second intermediate time intervals.

4. The method of claim 2, comprising the additional steps of:
   a. measuring first intermediate time intervals between each signal generated by the first sensor between the passage of the first axle and the purported passage of the second axle;
   b. measuring second intermediate time intervals between each signal generated by the second sensor between the passage of the first axle and the purported passage of the second axle;
   c. disregarding the signals associated with the passage of the second axle unless the sum of said first intermediate time intervals is at least approximately equal to the sum of said second intermediate time intervals.

5. The method of claim 1, whereby the duration of a signal generated by a sensor is measured and the time corresponding to the midpoint of said signal is used as the time of the signal.

6. The method of claim 2, whereby the duration of a signal generated by a sensor is measured and the time corresponding to the midpoint of said signal is used as the time of the signal.

7. The method of claim 3, whereby the duration of a signal generated by a sensor is measured and the time corresponding to the midpoint of said signal is used as the time of the signal.

8. The method of claim 5, whereby the midpoint of the signal is determined by digitizing the signal, measuring the time of the leading edge of the signal, measuring the time of the trailing edge of the signal, and averaging the times of the leading and trailing edges to obtain the time of the midpoint of the signal.

9. The method of claim 6, whereby the midpoint of the signal is determined by digitizing the signal, measuring the time of the leading edge of the signal, measuring the time of the trailing edge of the signal, and averaging the times of the leading and trailing edges to obtain the time of the midpoint of the signal.

10. The method of claim 7, whereby the midpoint of the signal is determined by digitizing the signal, measuring the time of the leading edge of the signal, measuring the time of the trailing edge of the signal, and averaging the times of the leading and trailing edges to obtain the time of the midpoint of the signal.

* * * * *